United States Patent [19]
Bales

[11] 3,855,946
[45] Dec. 24, 1974

[54] ADJUSTABLE LEG STRUCTURE

[75] Inventor: Emmett Robert Bales, North Manchester, Ind.

[73] Assignee: American Standard Inc., New York, N.Y.

[22] Filed: Sept. 25, 1972

[21] Appl. No.: 291,865

[52] U.S. Cl. ............... 108/144, 248/188.5, 403/108, 403/379
[51] Int. Cl. ..................... A47b 9/00, F16m 11/26
[58] Field of Search ........... 248/188.2, 188.5, 188.8; 108/144; 85/9; 403/108, 109, 379

[56] References Cited
UNITED STATES PATENTS

| | | | |
|---|---|---|---|
| 2,846,761 | 8/1958 | Evans | 108/144 X |
| 3,178,984 | 4/1965 | Barothy | 85/9 R X |
| 3,199,825 | 8/1965 | Bellows | 108/144 |
| 3,261,584 | 7/1966 | Miller | 248/188.2 |
| 3,369,440 | 2/1968 | King, Jr. | 85/9 R |

FOREIGN PATENTS OR APPLICATIONS

| | | | |
|---|---|---|---|
| 689,273 | 3/1953 | Great Britain | 108/144 |

*Primary Examiner*—Roy D. Frazier
*Assistant Examiner*—William E. Lyddane
*Attorney, Agent, or Firm*—Robert G. Crooks; Jefferson Ehrlich

[57] ABSTRACT

This covers adjustable leg structure for furniture, such as a desk or table, employing two telescoping tubes which are affixed to each other for holding them firmly in position without any "play" or "shimmy." Two such telescoping tubes form the segments of each leg of the table or desk furniture which are to be adjustable and yet, after each adjustment, the composite leg structure must be solid, free of any play on account of the differences in the proportions of the two leg components making up the structure. The two telescoping tubes have equally spaced apertures and the tubes are joined to each other by inserting a bolt having a tapered head which enters the openings in the two tubes and then threadedly engages an elongated plate which may preferably be welded or otherwise affixed to the inner tube segment. The elongated plate is L-shaped. If the tube components and the plate member are provided with equally spaced apertures, the leg members may be adjusted in their overall height, as may be desired, without altering the sturdiness of the leg structure.

5 Claims, 6 Drawing Figures

ADJUSTABLE LEG STRUCTURE

This invention relates generally to furniture, such as desks, tables or the like which are to be adjustable in height. In broader terms, this invention relates to mechanism including pairs of telescoping members which are to be joined together to form the legs of furniture. The telescoping members may be elliptical, rectangular, square or of any other cross-sectional shape and they are of different cross-sectional dimensions so that one may be slidable within the other and so organized and arranged that the relative position of one of the telescoping members with respect to the other may be adjusted and also held sturdy and relatively immovable after adjustment.

Stated generally, this invention may be considered to relate to leg structures for tables, desks, etc., each of which structures may be composed of two segments which are tubular in shape and of different dimensions so that one may be slidable within the other and so arranged that the tubular structure may be set at any height and maintained at any height, and readily readjusted to any other height, while maintaining the tubular structure sturdy and firm thereafter after each adjustment. According to this invention, two long thin elliptical tube members, by way of example, of slightly different major and minor axes, are arranged to include mechanism to render one slidable within the other so that they may be easily and quickly assembled and maintained strong for use as a table leg. Each tube member is provided with a plurality of apertures which are aligned longitudinally, i.e., vertically, along the tube members so that a bolt or other device may be inserted within apertures of the tube members to fix the relative height of the overall leg structure. To accomplish this, a longitudinal plate member is inserted within and held parallel to the inner walls of the hollow tube of small dimensions and the plate member is likewise provided with correspondingly spaced apertures all of which are threaded. one or more bolts, each comprising a shank having a threaded segment and a tapered unthreaded segment beneath its head, may be inserted through the respective apertures of the two telescoping hollow tubes and threaded into the longitudinal plate member so that all three components will be tied together and reinforced so as to firmly be gripped by the bolt member.

This invention is especially applicable to long tube members which are to be adjustably joined together by a bolt but which are so small relatively that it is virtually impossible to insert and hold a threaded nut within the smaller or inner tube member to receive and hold the threaded segment of the bolt and also prevent looseness or "play" between the tube members. To overcome this difficult situation, a longitudinal plate member is inserted within the inner tube and firmly held in place parallel to both tube members and a bolt is inserted through the walls of the two tubes and into the threaded opening in the plate member, the bolt having a tapered head to enter the tube openings to reinforce the tube members.

This invention represents a distinct improvement over the structure shown and described in a W.C. Miller U.S. Pat. No. 3,261,584, issued July 19, 1966, assigned to a company which is now a division of the assignee of the present application. The structure of the patent requires a V-shaped plate and two diagonal braces on each leg to provide strength and sturdiness to the relatively weak structure. These components increase the number of parts required to build a table and they complicate its adjustability and, in addition, they substantially increase the cost of the combination. Furthermore, the patented structure employs a flat plate, not an L-shaped plate, and the plate has two different thicknesses and it is inserted in the upper leg segment, not the lower leg segment.

The present invention together with its other objects and features, will be better and more clearly understood from the following more detailed description and explanation given by way of example, when read in connection with the accompanying drawing, in which.

Throughout the drawing, the same or similar reference characters will be employed to designate the same or similar parts wherever they may occur throughout the drawing.

Figure 1:
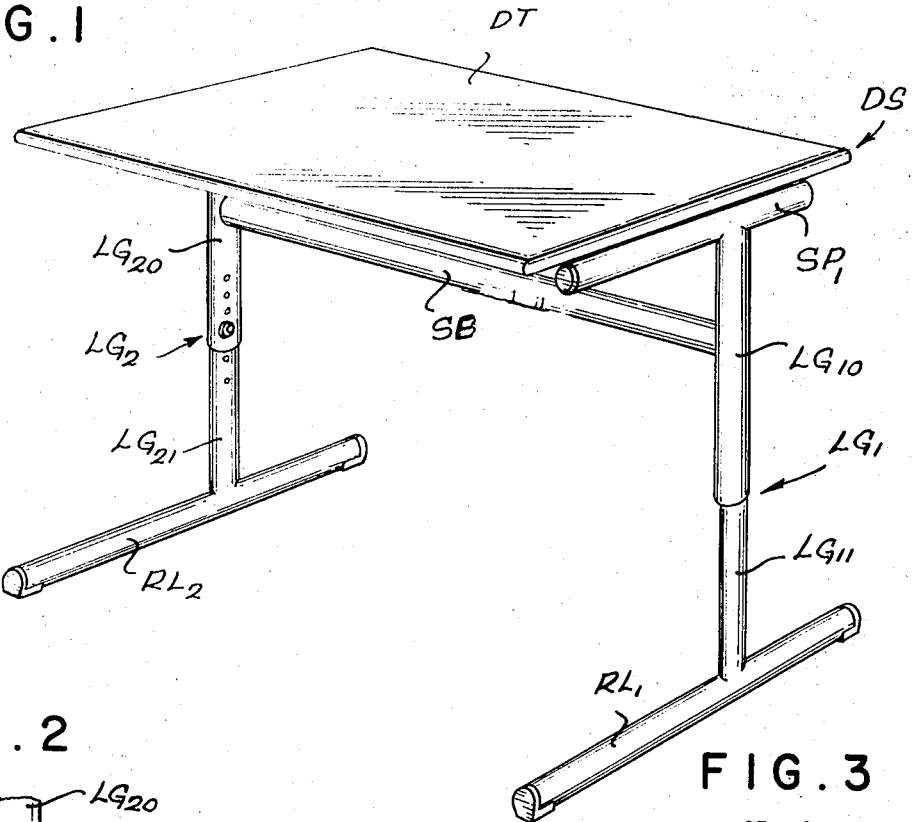
FIG. 1 illustrates a table or desk in perspective having two leg members to which the invention is applied.

Referring to FIG. 1 of the drawing, there is shown a form of furniture, such as a desk or table designated DS, which may comprise, for example, two legs LG1 and LG2, which are to be vertically adjustable, a table-top or desk DT, two slide rails RL1 and R12 affixed to the bottoms of the respective legs LG1 and LG2 and two tubular support members SP1 and SP2 (not visible) which are affixed to the upper ends of the respective legs LG1 and LG2 to receive and hold the desk top or table top DT. If desired, a tubular stretch bar SB may be interposed between the upper segments of the two legs LG1 and LG2, as shown, to join them to each other and to retain the upper segments of the two legs LG1 and LG2 relatively immovable with respect to each other.

Each of the legs LG1 and LG2 is composed of two vertical telescoping leg members, the leg members LG10 and LG11 being joined together to form right leg LG1, while the leg members LG20 and LG21 are telescopically joined to each other to form the left leg LG2. Each of the two leg members, such as LG10 and LG11, may be elliptical or ovular in shape and each is preferably made, for example, of rather thin carbon steel. Each upper leg member, such as LG10 and LG20, has major and minor axes which are slightly larger than the axes of the respective lower leg members LG11 and LG21 so as to receive the lower leg members LG11 and LG21 as they are slid within the upper respective leg member LG10 and LG20. The object is to render the relative positions of one of the leg members adjustable with respect to the other leg member in each of the two leg structures LG1 and LG2 so that the table top or desk top DT may be readily adjusted to any desired level above the floor, maintained in the desired elevation and held together free of "play" for long periods of time even after many adjustments. The employment of elliptical or ovular cross-sectional shapes serves to keep the two leg members of each respective leg always in proper alignment with each other and their apertures in alignment with each other to facilitate locking the leg members together at the desired elevation whenever adjustments are made.

The rails RL1 and RL2 may, if desired, be made of similar tubular material, i.e., tubular material which is elliptical or ovular in shape in which the longer axis is vertical, so as to facilitate the slidability of the desk or table DS across a floor whether or not it is carpeted.

Figure 2:
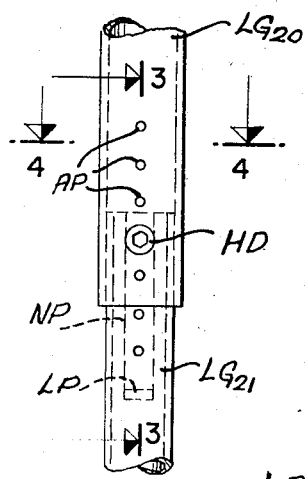
FIG. 2 is an enlarged detail drawing of two segments of each leg member connected to each other according to this invention.
Figure 3:
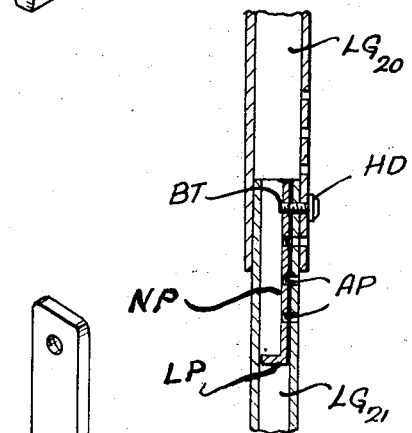
FIG. 3 illustrates a cross-sectional view of the leg members taken along lines 3—3 of FIG. 2.
Figure 4:
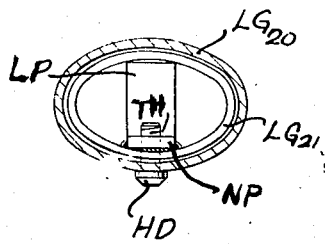
FIG. 4 shows a cross-sectional view taken along the lines 4—4 of FIG. 2.
Figure 5:
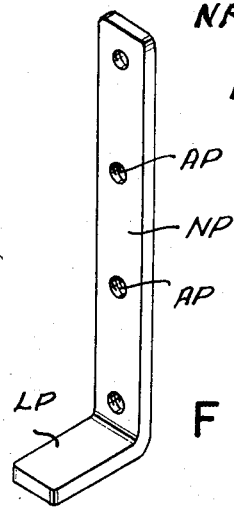
FIG. 5 shows a perspective view of an L-shaped member which is an important component of the combination according to the present invention.

Referring now to FIGS. 2, 3 and 4, there are shown, for illustration, a pair of leg members LG20 and LG21 in telescoped relation to each other, and an L-shaped nut plate NP is positioned within the inner and lower leg member LG21. The leg members and other components for each leg are the same and hence the description of one leg structure will apply equally to the other.

The lower or horizontal portion LP of the nut plate designated NP is a bit smaller in its horizontal dimension than the spacing between the inner walls of the lower tube LG21 between which the horizontal portion is to be located. If so arranged, the longer or longitudinal segment of the nut plate NP will therefore be close to, and substantially parallel with, the inner wall of the lower leg member LG21. The parallelism just referred to will improve the alignability of the leg segments and their fixation whenever adjustments are to be made. The nut plate NP is also preferably made of hardened steel, a material considerably harder than the carbon steel of which the leg segments LG20 and LG21 may be made.

The cooperating leg members, such as LG20 and LG21 and the corresponding nut plate NP are each provided with substantially equally spaced apertures AP aligned along the longitudinal or vertical axes of these components. The apertures preferably are of somewhat different sizes or proportions to receive a threaded bolt BT, as will be later described.

Figure 6:
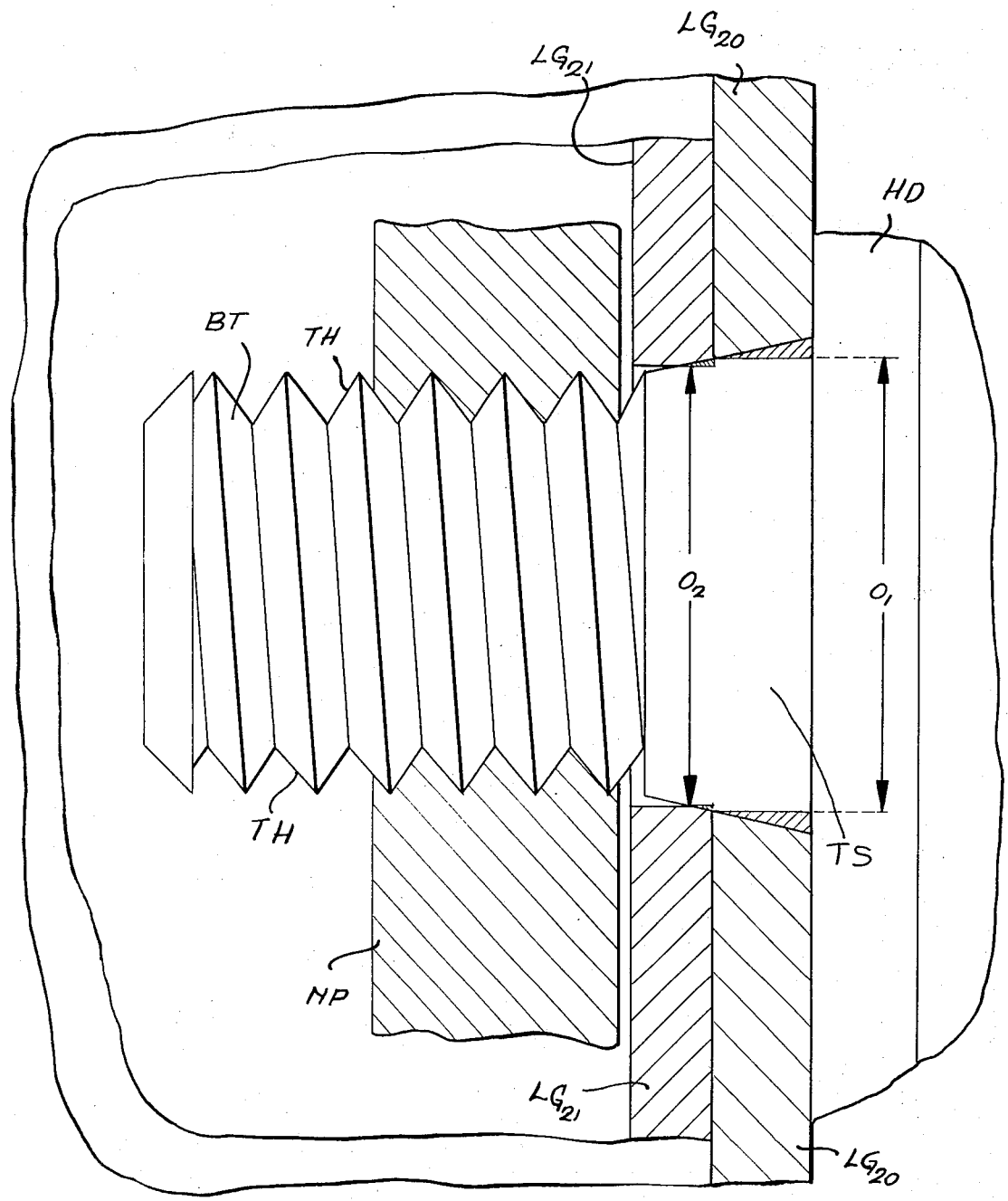
FIG. 6 illustrates an enlarged partial cross-sectional view showing the inter-relationship of the leg segments of one of the leg members and the L-shaped member.

Referring especially to FIG. 6, the upper leg member LG20 will have a circular aperture of, for example, a diameter $O_1$. This diameter will be larger than the circular aperture $O_2$ of the lower leg member LG21 with which it is associated. The nut plate NP in turn will have a threaded opening which has an external diameter somewhat smaller than the diameter $O_2$. The diameter will approximately correspond to the external diameter of the threaded segment TH of the bolt BT which is to be employed to join the three components to each other at their desired or assigned positions for the appropriate fixation of the elevation of the top of the desk DT.

It will be observed that, according to this invention, the nut plate NP has a much greater thickness than the thicknesses of the respective walls of the tubes LG20 and LG21. This is essential in order to provide sufficient female threads to receive the threaded segment TH of the bolt BT and at the same time hold the leg members in sturdy and immovable engagement. The leg members LG20 and LG21 are relatively thin, as shown. They are necessarily thin in order to reduce the overall weight of the metallic structure, as well as its cost. Because of the relative thinness of the walls of leg members LG20 and LG21, threading is difficult indeed within such walls; sufficient threading for holding the components is impossible. Hence, due to the thinness of the walls of the leg members, it is impossible, without a plate such as NP, to grasp and hold the parts together and avoid stripping of the threads.

Because of the relatively small dimensions of the inner tube LG21 and, even more importantly, because of the long length of the inner tube LG21, it becomes difficult or impossible to insert a nut within the inner walls of the tube LG21 and hold the nut in position while receiving the threaded segment TH of the bolt BT. Thus, each threaded aperture of the nut plate NP performs all of the functions of several nuts. In fact, because the nut plate NP is provided with numerous apertures, two or more bolts, each similar to the one designated BT, may be employed to firm up a mechanical connection between the leg segments to hold them in good engagement for heavy duty and long life.

The bolt BT has, in its preferred form, a frustoconical unthreaded segment TS located between the threaded segment TH of the shank of the bolt BT and its head HD, as shown in FIG. 6. The taper of the segment TS is such that the maximum diameter of the segment TS will exceed the diameter of each aperture AP of the leg LG1 through which it is inserted. The minimum diameter of the tapered segment TS will be somewhat less than the smaller diameter $O_2$ of the aperture of the inner leg member LG21. The minimum diameter of the tapered segment TS will be about equal to the external diameter of the threads TH, as already noted. The head HD of the bolt BT may also have a conventional end slot, whether for a screwdriver or for an Allen wrench or other tool, so that a considerable tangential force may be applied to the head HD of the bolt BT by whatever tool is used. Upon the application of a sufficiently large tangential force, the threaded shank segment TH of the bolt BT will spiral its way through the unthreaded apertures of the tubes LG20 and LG21 so as to radially align the apertures and, as the bolt BT advances, the tapered segment TS of the bolt BT will somewhat expand the internal surfaces of the apertures $O_1$ and $O_2$ of the leg members LG20 and LG21, as shown in FIG. 6.

Thus, the external diameter of the threads of the threaded segment TH of the bolt BT will traverse and expand the openings $O_1$ and $O_2$ of the leg members LG20 and LG21, and the tapered segment TS of the bolt BT may cut into or deflect the apertures $O_1$ and $O_2$, respectively, of the leg members LG20 and LG21.

The nut plate NP may preferably be welded to the inner wall of the inner or lower leg member LG21. This will not only permanently line up the apertures of the nut plate NP with those of the inner tube LG21, but it will also establish the nut plate NP as permanently immovable within the inner wall of the tube LG21. This will add to the sturdiness and firmness of the overall structure after it is assembled by the addition of the bolt BT.

The addition of the nut plate NP and the bolt BT to the thin walled ovular leg members LG20 and LG21 in the manner above indicated eliminates the "play"or "shimmy" that would otherwise develop. This structure maintains the sturdiness of the combination even if the bolt BT is removed and replaced again and again. This structure prolongs the life of the mechanism even against extraordinary stresses and strains and heavy loads.

The employment of the tapered segment TS on bolt BT not only aligns the apertures of the leg members LG20 and LG21, but it also establishes a firm contact between the head HD of the bolt BT with the two leg segments LG20 and LG21 even if the desk or table DS were subject to frequent or even violent vibrations. Furthermore, it is difficult, and almost impossible, for an unauthorized person not equipped with appropriate tools to upset the leg structure by removing the interconnected bolts. The outwardly expanding taper of the segment TS beneath the head HD positioned within the walls of the apertures AP of both leg members and coupled to a heavy plate NP of sufficient threads establishes a powerful grip on the components which cannot be easily dislodged.

The foregoing construction provides a relatively simple and easy arrangement for joining two relatively thin, long leg members which must be held firmly in contact with each other and which cannot provide sufficient threads to hold the threaded shank segment TH of the bolt BT.

In one arrangement setup for illustration, the leg member LG20 was made of No. 14 gauge carbon steel, the leg member LG21 was made of No. 16 gauge carbon steel, the nut plate NP was made of 3/16 of an inch thick carbon steel and the bolt BT was formed of hardened steel which was much harder than the carbon steel components.

What is claimed is:

1. An article of furniture, such as a desk or table, comprising a table top, at least one horizontal tubular support to which the table top is affixed, at least one adjustable leg connected to each horizontal support, each leg being composed of upper and lower hollow non-circular cylindrical tubular leg segments which are of the same shape but of different cross-sectional dimensions so that the end of the smaller dimensioned leg segment is the lower segment and is telescopically slidable within the other leg segment thereby forming an elongated substantially vertical adjustable composited leg, each leg segment having a plurality of unthreaded apertures spaced from each other by a spacing which is the same for both leg segments and vertically arranged in alignment, and clamping means for fastening each pair of telescopically arranged leg segments to each other so that they will be sturdy and substantially free of play, said clamping means comprising a relatively thick L-shaped bar of uniform thickness, said bar being oriented in its upright position and proportioned so that its horizontal branch is slightly smaller in length than the internal cross-sectional dimension of the lower leg segment within which it is disposed and its vertical branch is elongated, held and permanently affixed substantially entirely within the lower leg segment and parallel to the apertured inner wall of the lower leg segment, the vertical elongated branch of the bar having a plurality of threaded apertures which are spaced equally with those of both leg segments and vertically arranged in alignment and adjacent the apertures of both leg segments, and a threaded bolt or bolts each having a tapered unthreaded segment between its threaded segment and its head which is inserted through overlapping apertures of both leg segments and threadedly engaging a selected threaded aperture in said bar.

2. An article of furniture as claimed in claim 1 in which each adjustable leg contains a bolt made of a material which has a hardness exceeding the hardness of the leg segments and has its unthreaded tapered segment sufficiently large so that, when entering the unthreaded apertures of the hollow leg segments, it will press against the walls of the apertures and expand the apertures.

3. An article of furniture as claimed in claim 2 wherein each adjustable leg includes a slide rail affixed perpendicularly to the bottom of the lower leg segment and shaped to be of non-circular cross-section.

4. An article of furniture according to claim 1 in which the tapered unthreaded segment of the bolt is larger than the apertures of the leg segments so that it will continually press against the inner walls of the apertures.

5. An article of furniture according to claim 4, in which the L-shaped plate is welded to the smaller leg segment.

* * * * *